United States Patent [19]

Janowski

[11] Patent Number: 4,898,492

[45] Date of Patent: Feb. 6, 1990

[54] PRESSURE CLOSING DEVICE FOR JOINING THE EDGES OF PLASTIC SHEETS

[75] Inventor: Valery Janowski, Paris, France

[73] Assignee: Gefrem, Avallon, France

[21] Appl. No.: 26,919

[22] Filed: Mar. 17, 1987

[30] Foreign Application Priority Data

Mar. 17, 1986 [FR] France ............... 86 03759

[51] Int. Cl.$^4$ .................. F16D 1/00; B65D 33/24
[52] U.S. Cl. .................... 403/340; 403/344; 24/587
[58] Field of Search ............. 403/344, 326, 331, 340, 403/364, 375, 405.1, 300; 24/587, 579, 580

[56] References Cited

U.S. PATENT DOCUMENTS

| 2,354,485 | 7/1944 | Slaughter | 24/587 X |
| 2,791,807 | 5/1957 | Morin | 403/340 X |
| 4,363,345 | 12/1982 | Scheibner | 24/587 X |
| 4,581,269 | 4/1986 | Tilman | 24/587 X |
| 4,618,383 | 10/1986 | Herrington | 24/587 X |
| 4,731,911 | 3/1988 | Gould | 24/587 |
| 4,736,451 | 4/1988 | Ausnit | 24/587 X |

FOREIGN PATENT DOCUMENTS

| 0025656 | 3/1981 | European Pat. Off. . |
| 0076929 | 4/1983 | European Pat. Off. . |
| 0155612 | 3/1985 | European Pat. Off. . |
| 943221 | 5/1956 | Fed. Rep. of Germany . |
| 1066917 | 6/1954 | France . |
| 1202080 | 11/1960 | France . |
| 659970 | 10/1951 | United Kingdom . |
| 692636 | 6/1953 | United Kingdom . |

Primary Examiner—Andrew V. Kundrat
Assistant Examiner—Peter M. Cuomo
Attorney, Agent, or Firm—Hoffman, Wasson, Fallow & Gitler

[57] ABSTRACT

The invention relates to a pressure closing device for joining the edges of plastic sheets, comprising a shaped strip fastened by heat-sealing in the vicinity of each of the edges to be joined, each of the strips comprising a hooking element able to work with the corresponding hooking element of the shaped strip fastened in the vicinity of the other edge to be joined and a flap by which the shaped strip is fastened to the corresponding sheet.

The flap of each shaped strip has at least one intermediate longitudinal rib protruding from one of its faces.

3 Claims, 1 Drawing Sheet

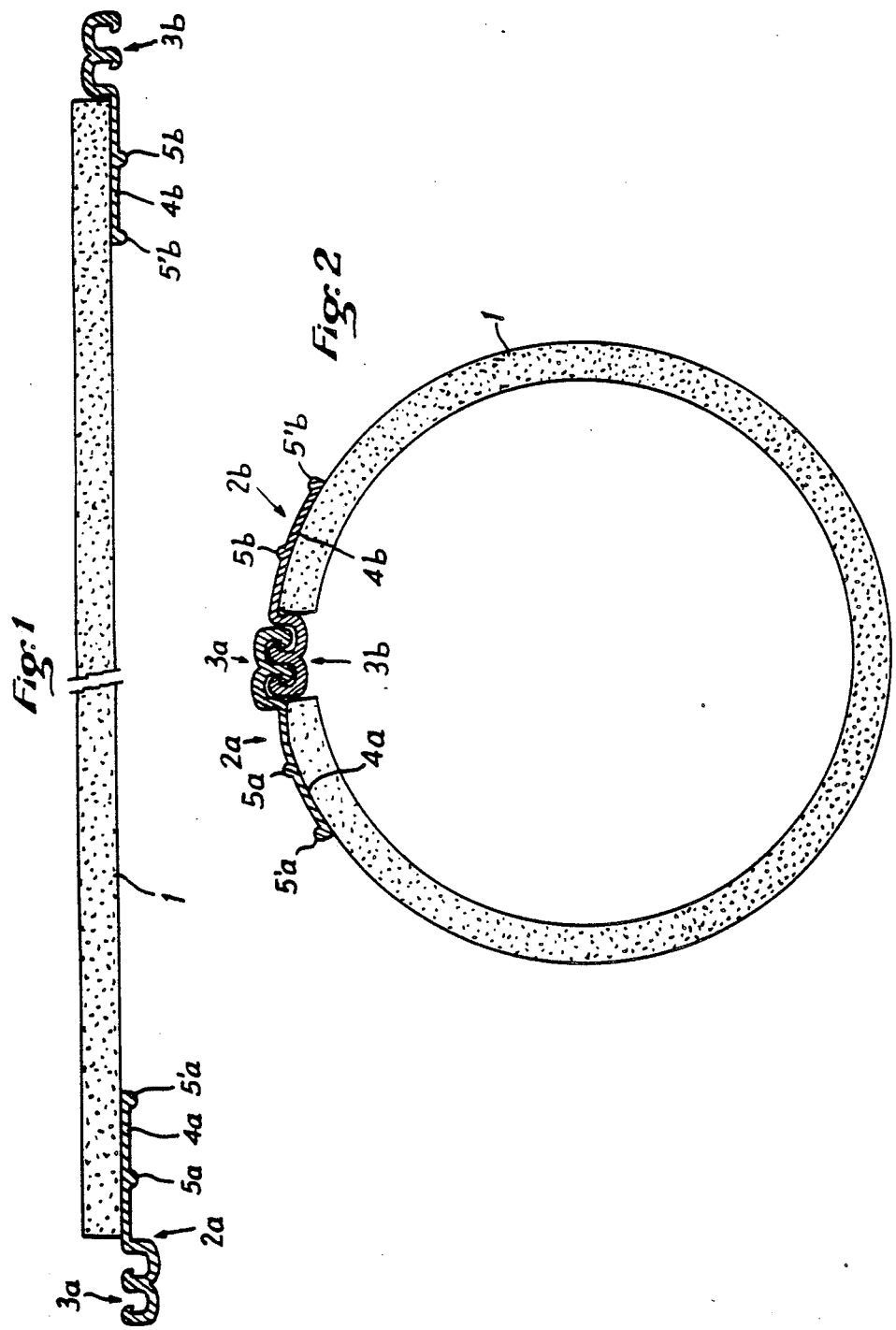

PRESSURE CLOSING DEVICE FOR JOINING THE EDGES OF PLASTIC SHEETS

This invention relates to a device of the pressure closing type for joining the longitudinal edges of two plastic sheets to be assembled, or the two longitudinal edges of a plastic sheet shaped as a tubular sheath.

For a long time, numerous types of pressure closings have been known, intended, for example, for bags or small bags of plastic sheets and comprising hooking means, generally one or more cooperating hooks, their opening and closing being obtained by engagement or disengagement respectively of the hooks, generally by means of a slide.

In some cases, the hooking means are made in one piece with the plastic sheet constituting the bag, and in other cases the hooking means are made on a shaped strip, exhibiting a stub in the form of a flap generally fastened by heat-sealing to the corresponding plastic sheet. In some cases (for example, GBA 642 636), the stub exhibits a reinforcement bead at its end.

An effort has been made to use such shaped strips to make pressure closings making it possible to join plastic sheets or to shape a plastic sheet as a tubular sheath, for example, to achieve a pipe thermal insulating sheath.

For this purpose, a shaped strip is fastened, particularly by heat-sealing, in the vicinity of each of the sheet edge to be joined or, in case it is desired to join two or more sheets together, along the longitudinal edges of successive sheets to be joined, the joining of the edges taking place by reciprocal engagement of means for hooking of the shaped strips.

However, experience shows that in the case of sheets that are relatively thick and/or made of cellular plastic, surface deformations of the flap of the heat-sealed shaped strip are noted in the vicinity of the longitudinal edge of the sheet, which is reflected by wrinklings and a less solid fastening of the shaped strip to the corresponding sheet.

This invention intends to avoid such drawbacks by particularly simple, economical means.

This invention is characterized by the fact that the flap of the shaped strip has at least one intermediate longitudinal rib projecting from one face of the flap made between the hooking means and the end of the flap.

Besides this or these intermediate rib or ribs, the flap can comprise an end rib projecting from one of its faces.

In an advantageous embodiment, the rib or ribs are placed on the face of the flap opposite the one fastened to the sheet.

However, it is possible within the context of the invention, to fasten the flap to the corresponding sheet with the rib or ribs in contact with the sheet. It is also possible to mount the shaped strips to be joined, one with its rib or ribs in contact with the surface of the sheet, the other with its rib or ribs turned opposite. This latter embodiment makes it possible to use the same shaped strip to achieve the two parts of the closing and therefore requires only a single extrusion spinneret for making of the strip.

Tests made by the applicant company showed that with the rib or ribs provided on the flap, there is obtained during heat-sealing of the shaped strip to the corresponding sheet a very solid surface bond, without any deformation or notable wrinkling at the level of the flap.

It is thought that this good result is due to the fact that the excess thicknesses shown by the longitudinal ribs have the effect of better distributing the heat applied during sealing of the flap unit.

To give a better understanding of the invention, an embodiment will now be described, in a way not at all limiting, with reference to the accompanying drawing in which:

FIG. 1 shows a plastic sheet provided at its two longitudinal ends with shaped strips achieving the closing device according to the invention, FIG. 2 shows the sheet of FIG. 1 shaped as a tubular sheath.

FIGS. 1 and 2 show a possible application of the closing device according to the invention to achieve, for example, thermal insulating tubular sheaths able to be placed, for example, around heating or refrigerating pipes. For this purpose, there is fastened along each longitudinal edge of a plastic sheet 1, a shaped strip 2a and 2b, respectively, each of the shaped strips comprising hooking means 3a and 3b respectively. In the example shown, each hooking means 3a and 3b is made up in a standard way by a unit of three ribs two of which have hook-shaped ends, working together, during application of a pressure as shown in FIG. 2, to achieve bonding of shaped strips 2a and 2b.

Each of the shaped strips exhibits for its fastening by heat-sealing to sheet 1 a thin flap 4a and 4b, respectively, each comprising in the example shown a projecting intermediate longitudinal rib 5a and 5b, respectively, and an end rib 5'a and 5'b, respectively.

In the example shown, the two shaped strips are not identical so that the ribs of the two strips, when these latter are fastened to sheet 1, are all turned opposite the surface of the flap fastened to the sheet.

However, it would be possible to replace shaped strip 2b by a shaped strip identical with strip 2a, in which case the ribs of one of the strips would be in contact with the sheet.

The shaped strip for embodying the pressure closing device can be made of any suitable material, for example, polyethylene, polypropylene or PVC.

In the example shown, flaps 4a and 4b of the two shaped strips exhibit a thickness of 3/10 millimeter, each of ribs 5a, 5'a, 5b, 5'b exhibiting a thickness of about 1 mm, and each of the flaps exhibiting a width of 10 mm.

Although the invention has been described in connection with a particular application, it is quite evident that it is in no way limited and that it is possible, for example, to use it for the joining of two or more protective sheets, joining of form walls, joining of sheets constituting elements of protective covers, tarpaulins, etc.

I claim:

1. In a pressure closing strip for joining two edges of cellular sheet material, wherein said strip comprises longitudinally extending hook means for interconnection with like hook means of a complementary pressure closing strip and a longitudinally extending flap having one face adapted to be welded to the sheet material along an edge thereof, and wherein said flap has a first lateral edge attached to said hook means and a second lateral edge opposite the first, the improvement comprising a first longitudinal rib, discrete from said hook means, protruding from only one face of said flap intermediate said first and second edges to reinforce the flap against wrinkling, and further comprising a second rib extending along said second edge parallel to said first rib and protruding from only one face of said flap.

2. The invention of claim 1, wherein said rib protrudes from that face of the flap opposite the face adapted to be welded to the sheet material.

3. A method of using the strip described in claim 1 comprising a step of connecting one of the same to opposite edges of a thermally insulating material in order to enable one to construct a thermally insulating sheath.

* * * * *